(12) United States Patent
Roe et al.

(10) Patent No.: US 10,764,648 B2
(45) Date of Patent: Sep. 1, 2020

(54) SYSTEMS AND METHODS FOR SORTING FAVORITE CONTENT SOURCES

(71) Applicant: ROVI GUIDES, INC., San Carlos, CA (US)

(72) Inventors: Glen E. Roe, Simi Valley, CA (US); Michael K. McCarty, Agoura Hills, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/461,559

(22) PCT Filed: Nov. 28, 2016

(86) PCT No.: PCT/US2016/063835
§ 371 (c)(1),
(2) Date: May 16, 2019

(87) PCT Pub. No.: WO2018/097833
PCT Pub. Date: May 31, 2018

(65) Prior Publication Data
US 2019/0356963 A1      Nov. 21, 2019

(51) Int. Cl.
*H04N 21/482*      (2011.01)
*H04N 21/258*      (2011.01)
(Continued)

(52) U.S. Cl.
CPC ... *H04N 21/4826* (2013.01); *H04N 21/25891* (2013.01); *H04N 21/4325* (2013.01);
(Continued)

(58) Field of Classification Search
CPC ......... H04N 21/4826; H04N 21/25891; H04N 21/4325; H04N 21/44222; H04N 21/4532
See application file for complete search history.

(56) References Cited

U.S. PATENT DOCUMENTS

| 6,239,794 B1 | 5/2001 | Yuen et al. |
| 6,564,378 B1 | 5/2003 | Satterfield et al. |

(Continued)

FOREIGN PATENT DOCUMENTS

| WO | WO 2000/011869 | 3/2000 |
| WO | WO 2011/102886 | 8/2011 |

OTHER PUBLICATIONS

International Search Report and Written Opinion of PCT/US2016/063835 dated Feb. 20, 2017.

(Continued)

*Primary Examiner* — Sumaiya A Chowdhury
(74) *Attorney, Agent, or Firm* — Haley Guiliano LLP

(57) ABSTRACT

Systems and methods for sorting favorite content sources are provided. A list of favorite content sources arranged in a first order is stored. The favorite content sources in the list are accessed according to the order of the favorite content sources in the list. At a given time, a user request to change a currently accessed content source to one of the favorite content sources in the list is received. In response to receiving the user request, an attribute of content presented on the currently accessed content source at the given time is identified. The favorite content sources in the list are rearranged into a second order based on the identified attribute. The favorite content sources in the list are accessed according to the second order in response to receiving the user request.

20 Claims, 7 Drawing Sheets

(51) Int. Cl.
*H04N 21/432* (2011.01)
*H04N 21/442* (2011.01)
*H04N 21/45* (2011.01)
*H04N 21/462* (2011.01)
*H04N 21/475* (2011.01)
*H04N 21/81* (2011.01)

(52) U.S. Cl.
CPC ... *H04N 21/44222* (2013.01); *H04N 21/4532* (2013.01); *H04N 21/4622* (2013.01); *H04N 21/4755* (2013.01); *H04N 21/8133* (2013.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2005/0251827 A1 | 11/2005 | Ellis et al. |
| 2010/0153885 A1 | 6/2010 | Yates |
| 2012/0311633 A1* | 12/2012 | Mandrekar ........ H04N 21/4126 725/40 |
| 2014/0047476 A1 | 2/2014 | Arling et al. |

OTHER PUBLICATIONS

International Preliminary Report on Patentability PCT/US2016/063835 dated May 28, 2019.

\* cited by examiner

700

710
Store a List of Favorite Content Sources Arranged in a First Order, wherein the Favorite Content Sources in the List are Accessed According to the Order of the Favorite Content Sources in the List

720
Receive, at a Given Time, a User Request to Change a Currently Accessed Content Source to One of the Favorite Content Sources in the List

730
In Response to Receiving the User Request, Identify an Attribute of Content Presented on the Currently Accessed Content Source at the Given Time

740
Rearrange the Favorite Content Sources in the List into a Second Order Based on the Identified Attribute

750
Access the Favorite Content Sources in the List According to the Second Order in Response to Receiving the User Request

FIG. 7

SYSTEMS AND METHODS FOR SORTING FAVORITE CONTENT SOURCES

CROSS-REFERENCE TO RELATED APPLICATIONS

This application is a national stage application under 35 U.S.C. § 371 of International Application PCT/US2016/063835, filed Nov. 28, 2016. The disclosure of which is hereby incorporated by reference herein in its entirety.

BACKGROUND

Typical systems allow users to navigate through a list of favorite channels. In these systems, a list of favorite channels may be created by the user or may be automatically created by the system. The ordering of the channels in the list is static resulting in the channels in the list being accessed in the same sequence every time the user requests to navigate through the favorite channels list. Because such favorite channel lists are static, they do not take into consideration the reasons why a user may be requesting to change a given channel being watched to access the favorite channels. In addition, while a channel that is on the list of favorite channels may be of interest to the user, the content being transmitted by that channel at a given time may not be of interest to the user.

As such, when the user requests to navigate through the favorite channels list in these systems, content may still be presented to the user that may not be of interest to the user. This results in the user having to continue cycling through the channels in the favorite channels list until a channel with content of interest to the user is found. This introduces inefficiencies into the systems because more inputs from the user need to be processed, content that is not of interest to the user needs to be received, decoded and presented before the user decides to change channels again, and time is wasted waiting for the user to locate a channel of interest.

SUMMARY

Accordingly, methods and systems are disclosed herein for sorting favorite content sources. For example, a list of favorite content sources arranged in a first order may be generated and stored. The media guidance application may monitor content being accessed by a user from a given content source. When the user requests to access a favorite content source (e.g., change channels), the media guidance application may sort the favorite content sources based on the content that was presented to the user from the given content source and the content that is currently being provided from each of the content sources in the favorites list. In some implementations, the media guidance application may also determine whether the content that was being provided from the given content source and/or that is being provided from the favorite content sources matches a user profile. The media guidance application may further sort the favorite content sources in the favorites list based on this determination.

In some embodiments, a list of favorite content sources arranged in a first order may be stored. The favorite content sources in the list may be accessed according to the order of the favorite content sources in the list. At a given time, a user request to change a currently accessed content source to one of the favorite content sources in the list may be received. In response to receiving the user request, an attribute of content presented on the currently accessed content source at the given time is identified. The favorite content sources in the list may be rearranged into a second order based on the identified attribute. The favorite content sources in the list may be accessed according to the second order in response to receiving the user request.

In some embodiments, a list of favorite content sources arranged in a first order may be generated. For example, a user input may be received that selects any number of content sources for inclusion in a favorites list. The user input may also specify an order of the content sources in the list and whether a given one of the content sources is a marked source. In some implementations, the content sources in the favorites list may be automatically selected and the order may be automatically determined. An indication of whether or not a given content source on the list is a marked source may be automatically set. The favorite content sources in the list may be accessed according to the order of the favorite content sources in the list.

In some embodiments, a video from a given content source (e.g., a marked content source) may be received. While the video is being received from the marked source, a user request to change the accessed content source to one of the favorite content sources in the list may be received at a given time. In response to receiving the user request, a given play position within the video received from the given content source at the given time may be determined. For example, an amount or percentage of a media asset received from the marked content source may be determined.

In some embodiments, an attribute of the video at the determined play position (or a play position that precedes the determined play position by a given amount) may be identified. In some implementations, a database of a plurality of video entries may be searched to identify a video entry associated with the video received from the marked content source. Each of the plurality of video entries may include a video identifier field, a play position field and an attribute field associated with the play position field. The video identifier fields of each of the video entries in the database may be searched to identify one of the video entries that includes a video identifier field that matches the video identifier of the video currently being accessed from the marked content source. In some implementations, the attribute may be at least one of a character in a scene, an actor, a director, a genre, a category, a sound category, a duration, a quality metric, and a program type. In some implementations, the content source may be at least one of an on-demand source, a broadcast source, a cable source, a satellite source, a television channel, an Internet source, and a website.

In some implementations, a given attribute may be retrieved, from the identified entry, from the attribute field that is associated with a play position field that includes a play position that corresponds to the given play position. For example, the play position of the video that is accessed when the user request to access the favorite content sources may be compared with the play positions stored in the play position field of the retrieved video entry. For example, the play position of the video that precedes by a threshold amount the play position that is accessed when the user request to access the favorite content sources may be compared with the play positions stored in the play position field of the retrieved video entry. The attribute associated with the play position that matches the play position of the video that was accessed may be retrieved from the attribute field.

In some embodiments, a plurality of videos being transmitted from each of the favorite content sources at the given time may be identified. A set of video entries associated with the identified plurality of videos may be retrieved. Play positions of videos being transmitted by the favorite content sources at the given time may be identified. These play positions may be searched in the play position fields of the retrieved video entries to identify attributes associated with the matching play positions.

In some embodiments, the retrieved attributes of the videos transmitted by the favorite content sources may be compared with the attribute of the video transmitted by the marked content source. The attribute of the marked content source may be the attribute that was present in the video at the time the user request to access the favorite content sources was received and/or the attribute that was present in the content a threshold amount of time before the user request was received. A determination may be made as to whether the retrieved attributes of the videos transmitted by the favorite content sources correspond to the attribute of the video transmitted by the marked content source. In some implementations, the attributes are determined to correspond if they are the same or are similar to each other. In some implementations, the attributes are determined to correspond if they are different or opposite from each other.

In some embodiments, the retrieved video entries of the favorite content sources may be ranked based on the determination of whether the attributes of content from those sources correspond to the attribute of the content from the marked content source. In some implementations, the favorite content sources in the list may be rearranged into a second order based on the rankings of the retrieved video entries. The favorite content sources may be accessed in accordance with the second order in response to receiving the user request to access the favorite content sources at the given time when the user was accessing content from the marked content source.

In some embodiments, a profile associated with the user may be retrieved. A profile attribute may be selected from the retrieved profile. A determination may be made as to whether the retrieved plurality of attributes corresponds to the profile attribute. Each of the retrieved video entries may be associated with a top rank in response to determining that the respective attribute of the video entry matches the given attribute and matches the profile attribute.

In some embodiments, the top rank may be a first rank. Each of the retrieved video entries may be associated with a second rank, lower than the first rank, in response to determining that the respective attribute of the video entry fails to match the given attribute. Each of the retrieved video entries may be associated with a third rank, lower than the first and second ranks, in response to determining that the respective attribute of the video entry matches the given attribute and fails to match the profile attribute.

In some embodiments, attributes of content received from the given content source (e.g., the marked content source) may continue to be monitored while one of the favorite content sources are accessed. A determination may be made as to whether the monitored attributes correspond to the given attribute. In response to determining that none of the monitored attributes correspond to the given attribute, the favorite content sources in the list may be rearranged into a third order. In such circumstances, the given content source (e.g., the marked content source) may be positioned first in the third order ahead of the other favorite content sources.

In some embodiments, the user request may be received by receiving a first user selection of a favorites key on an input device. In such circumstances, the favorite content sources in the list are accessed by accessing a first of the favorite content sources that is positioned first in the list in response to receiving the user request. A second user selection of the favorites key may be received after the first favorite content source is accessed. In response to receiving the second user selection, a second of the favorite content sources that is positioned second in the list following the first favorite content source may be accessed.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 7 and 8 are illustrative flow diagrams for sorting favorite content sources in accordance with some embodiments of the disclosure.

DETAILED DESCRIPTION

Figure 1:
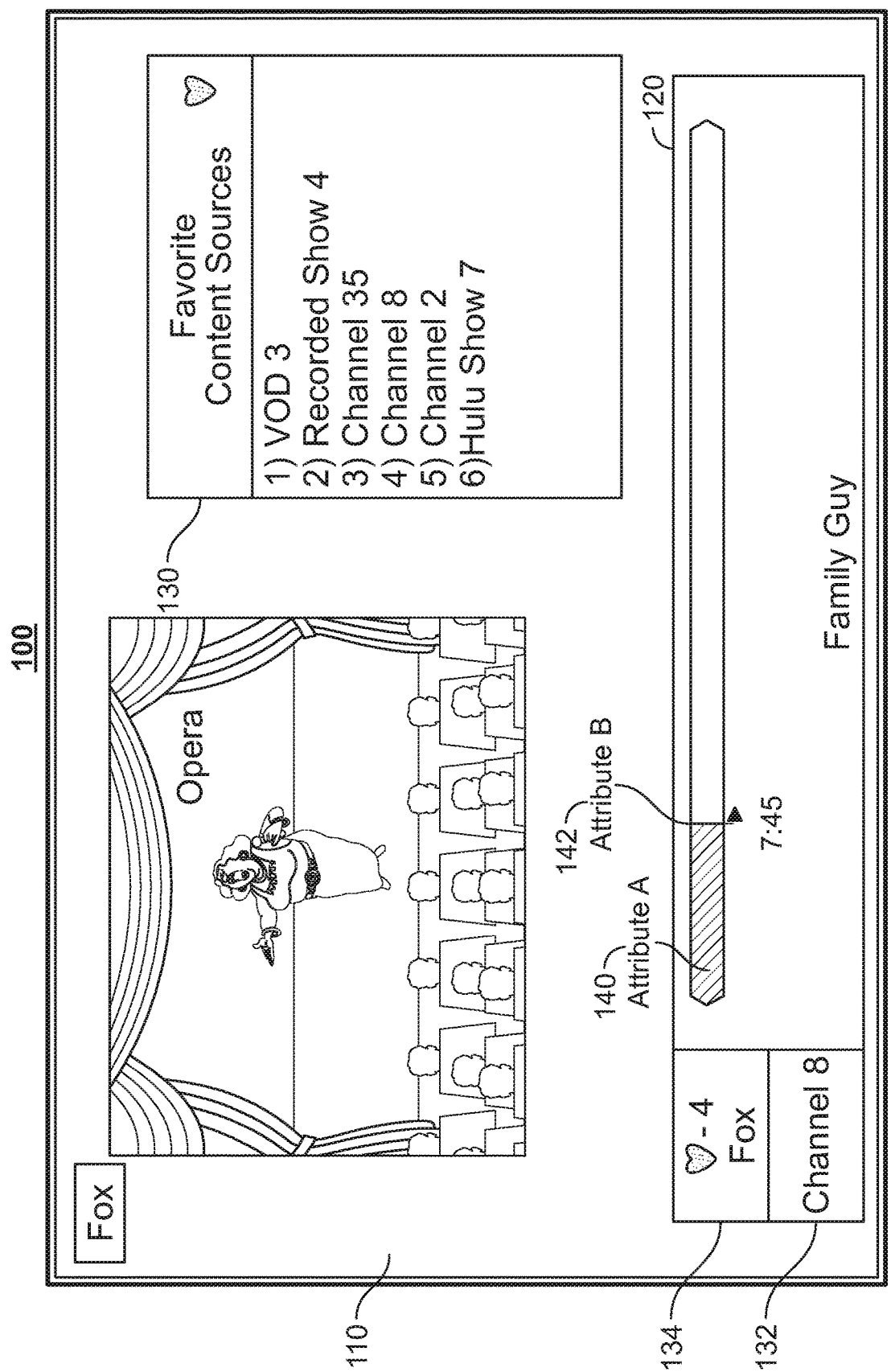
FIG. 1 shows an illustrative display screen that may be used to provide an interface for sorting favorite content sources in accordance with an embodiment of the disclosure.

Methods and systems are disclosed herein for sorting favorite content sources. In particular, the described methods and systems monitor content the user is accessing at the time a user requests to navigate through favorite content sources. The methods and systems automatically determine an attribute of the monitored content and sort the list of favorite content sources based on that attribute. The list of favorite content sources is sorted based on whether an attribute of content transmitted by each of the content sources corresponds to the attribute of the monitored content. Accordingly, a favorite content source that is transmitting content the user is more likely to be interested in may be accessed before other favorite content sources on the list are accessed.

As referred to herein, the phrases "favorite content source list," "favorite list," "favorite channels list" and "favorites" refer to a list content sources arranged in a given order. In some embodiments, each content source in the list is accessed sequentially according to the order in the list. The content sources in the list may be accessed when a user requests to access the favorites list starting with the content source at the top of the list. In some embodiments, the content sources in the list are sequentially accessed according to their position in the list with each respective favorites command received from the user. For example, the first time a user inputs the favorites command, the first content source in the favorites list may be accessed. When the user inputs the favorites command a second time, after the first content source is accessed, the second content source in the favorites list may be accessed. When the last content source in the list is being accessed and the user inputs the favorites command, the system may cycle back to the first content source in the favorites list.

As referred to herein, the phrases "favorite content source" and "favorite channel" refer to a content source that is included in a favorites list.

As referred to herein, the phrase "favorites command" refers to an input received from the user to access or cycle through the favorites list. The command may be received through a dedicated favorites button on a remote control, by selection of a favorites key displayed on a screen, verbally speaking a favorites phrase, or any combination thereof.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application, a media application, a master media application, or a guidance application. In some embodiments, a plurality of applications is implemented on a given device.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media or machine-readable media. Computer- or machine-readable media include any media capable of storing data. The computer- or machine-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may he available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.)), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In some embodiments, the media guidance application may monitor content a user is accessing. The media guidance application may determine attributes of the content the user is accessing. The media guidance application may receive a user request to change content sources and to navigate to a favorite content source. This user request may be received at a given time. The media guidance application may determine a given attribute of the content the user was accessing at the given time. The media guidance application may determine whether that given attribute corresponds to an attribute of content being transmitted from each of the favorite content sources. Based on whether that given attribute corresponds to the attribute of the content from the favorite content sources, the media guidance application may rearrange the content sources in the favorites list into a different order.

In some embodiments, the media guidance application may rearrange the favorite content sources in the favorites list based on the given attribute being transmitted by a favorite content source that has been marked in the favorites list. Marked favorite content source may refer to a single or multiple content sources in the favorites list which have been identified as being of particular interest to the user more than other favorite content sources. The favorite content source may be marked based on manually being identified by the user for marking at system startup or when a user accesses the favorite content source and presses a dedicated marking button. In some implementations, the favorite content source may be automatically marked by the media guidance application in response to determining that the user has been viewing content continuously from the marked favorite content source for a threshold amount of time. As referred to below, media asset 110 is being provided by content source 132 which has been marked.

In some embodiments, the media guidance application may determine whether a profile attribute of the user matches the given attribute and/or the attributes of the content from the favorite content sources. The media guidance application may sort and rearrange the content sources in the favorites list based on whether the given attribute corresponds to the attribute of the content from the favorite content sources and based on whether the profile attribute corresponds to those attributes.

FIG. 1 shows an illustrative display screen 100 that may be used to provide an interface for sorting favorite channels in accordance with an embodiment of the disclosure. Screen 100 includes a media asset 110 (e.g., the program "Family Guy"), an information region 120 and a favorites list menu 130. In some embodiments, in response to the user requesting access to the media asset (e.g., the program "Family Guy"), the media guidance application may present screen 100 showing video of selected media asset 110.

Information region 120 may include a title of media asset 110 and other information (e.g., description information) (not shown). Information region 120 may include a transport bar, which may include a viewing progress indicator. The viewing progress indicator may indicate how much of the media asset the given user has watched relative to a starting point and may be displayed as a particular color, shade, shape, etc. Information region 120 may include a content source identifier 132 and a favorite channel indicator 134. Content source identifier 132 may indicate which content source is currently being accessed from which media asset 110 is being received. In response to determining that the content source corresponding to content source identifier 132 is included in the favorites list, the media guidance application may include favorite channel indicator 134. Favorite channel indicator 134 may indicate that the current content source being accessed is included in the user's favorite channel list and may also indicate the position of the content source within the favorite channel list. For example, indicator 134 indicates that content source currently being accessed (channel 8) is in the fourth position in the favorites list.

In some embodiments, while the media guidance application is presenting media asset 110, the media guidance application may receive a user request to access the favorite channels list. For example, the user may select a favorites button on a remote control which may instruct the media guidance application to change content sources to the next (or first) favorite content source in the favorites list. In response to receiving the user request to access the favorite channels list, the media guidance application may determine a play position within media asset 110 when the user request was received. For example, the media guidance application may determine that at play position 7:45 (min:sec), the media guidance application received a user request to access a favorite content source (e.g., the user pressed the favorites button on a remote control).

The media guidance application may retrieve a data structure associated with media asset 110. The data structure may include a video identifier field, an attributes field, and a play position field. In some implementations, the media guidance application may retrieve this data structure in response to receiving the user request to access a favorite content source. In some implementations, the media guidance application may retrieve this data structure in response to receiving a user request to access the currently accessed source from which media asset 110 is received. The media guidance application may retrieve an identifier (e.g., a title) of media asset 110 and search video identifier fields of data structures stored in a database to find the data structure associated with media asset 110. The media guidance application may search the play position field in the retrieved data structure for a play position that matches the play position at which the user request to access the favorite content source was received. For example, the media guidance application may search the play position field in the retrieved data structure for a play position that matches the play position 7:45. In some embodiments, the play position that matches the play position at which the user request was received may be a range of play positions that overlap the play position at which the user request was received. For example, the play position stored in the retrieved data structure play position field may include a range of play positions (e.g., 5:30-8:55 (min:sec)). The media guidance application may determine that this range of play positions overlap with play position 7:45 and therefore match.

The media guidance application may retrieve the attribute from the attribute field of the retrieved data structure that is associated with the play position field that matches the play position at which the user request was received. For example, the media guidance application may retrieve "attribute B" 142 from the attribute field of the data structure associated with media asset 110. Attribute B 142 may indicate that the current scene at play position 7:45 may be an opera performance (e.g., opera sound category).

As referred to herein, the term "attribute" refers to a character in a scene, an actor, a director, a genre, a category, a sound category, a duration, a quality metric, a program type, or any other indication of content in a given segment of a media asset.

The media guidance application may retrieve a plurality of media asset identifiers corresponding to media assets currently being received from each of the favorite content sources. For example, the media guidance application may access media guidance data for each content source in the favorites list. The media guidance application may process the media guidance data to determine what media asset is currently being transmitted by each favorite content source. The media guidance application may search and retrieve from a database the data structures associated with each of the determined media assets. The media guidance application may also determine a current play position within each of the media assets being transmitted by the favorite content sources. The media guidance application may retrieve from the data structure of each media asset transmitted by each favorite content source the attribute of the media asset currently being transmitted by the favorite content source.

For example, the media guidance application may retrieve a first data structure associated with a first media asset transmitted by a first favorite content source. The data structure may include a video identifier field, an attributes field, and a play position field. The media guidance application may retrieve an identifier (e.g., a title) of the first media asset currently being transmitted by the first favorite content source and search video identifier fields of data structures stored in a database to find the data structure associated with the first media asset. The media guidance application may search the play position field in the retrieved data structure for a play position that matches the play position currently being received from the first favorite content source. The media guidance application may retrieve the first attribute from the attribute field of the retrieved data structure that is associated with the play position field that matches the play position of the first media asset. The media guidance application may perform this process for each media asset transmitted by each of the favorite content sources.

In some embodiments, the media guidance application may determine which of the attributes of the content from the favorite content sources correspond to the attribute of media asset 110 received from the current content source. The media guidance application may perform this determination in response to receiving the user request to access the favorite content sources. In some embodiments, the media guidance application may determine that the attributes of the content from the favorite content sources correspond to the attribute of media asset 110 by determining whether the attributes match. For example, the media guidance application may determine that attribute B 142 (e.g., opera sound category) corresponds to attribute A of content from one of the favorite content sources. In some implementations, the media guidance application may determine that attribute B 142 (e.g., opera sound category) corresponds a different attribute of content from one of the favorite content sources that is related to attribute B 142. For example, the media guidance application may determine that attribute B 142. (e.g., opera sound category) corresponds to the classical music sound category of content from one of the favorite content sources.

In some embodiments, the media guidance application may determine attribute B 142 of media asset 110 corresponds to a user profile attribute. In particular, the media guidance application may retrieve a user profile of the user who is requesting to access the favorite content sources. The media guidance application may extract or retrieve from the user profile a list of attributes of content the user likes and/or dislikes. For example, the media guidance application may determine that attribute B 142 of media asset 110 corresponds to the user profile attribute when attribute B 142 (e.g., opera sound category) matches attribute A of the user profile or a related user profile attribute. In some implementations, the media guidance application may determine that attribute B 142 of media asset 110 corresponds to the user profile attribute when attribute B 142 (e.g., opera sound category) does not match any user profile attribute or any related user profile attribute.

In some embodiments, the media guidance application may rank the favorite content sources on the favorites list based on whether the attributes of content from those sources correspond to attribute B 142 of media asset 110. In some embodiments, the media guidance application may rank the favorite content sources on the favorites list based on whether the attributes of content from those sources correspond to attribute B 142 of media asset 110 and based on whether attribute B 142 of media asset 110 corresponds to a user profile attribute.

For example, the media guidance application may store a first rank (e.g., high rank) in a first data structure associated with a first favorite content source when the attribute of the content from that first favorite content source matches attribute B 142 of media asset 110 and when attribute B 142 of media asset 110 matches a user profile attribute. In such circumstances, the user may be requesting to access the favorite content sources because the user is interested in viewing content that matches media asset 110 presented on content source 132. For example, media asset 110 may be a football game that includes a particular football team the user favors. The media guidance application may determine that the attribute of media asset 110 is a football game featuring a particular team and may determine that the particular team is included in a profile of the user as a favored team of the user. As such, the media guidance application may search for content from the favorite content sources that is related to the football game (e.g., other football games featuring rival teams to the particular team shown in media asset 110 or teams that are in the same division as the team shown in media asset 110). The media guidance application may associate a highest rank with such favorite content sources because it is likely the user prefers to continue watching this type of content when the user requests to access the favorite content sources.

For example, the media guidance application may store a second rank (e.g., medium rank) in a second data structure associated with a second favorite content source when the attribute of the content from that second favorite content source fails to match attribute B 142 of media asset 110. In such circumstances, the user may be requesting to access the favorite content sources because an undesirable attribute (e.g., an opera sound category) is currently being presented on content source 132. As such, the media guidance application may search for content from the favorite content sources that does not include that undesirable attribute (e.g., content that includes no music or rock music). The media guidance application may associate a medium rank with such favorite content sources that are found. The second rank (the medium rank) may be lower than the first rank stored in the first data structure.

For example, the media guidance application may store a third rank (e.g., low rank) in a third data structure associated with a third favorite content source when the attribute of the content from that third favorite content source matches attribute B 142 of media asset 110 and when attribute B 142 of media asset 110 fails to match a user profile attribute. In such circumstances, the user may be requesting to access the favorite content sources because the user is disinterested in the current portion of matches media asset 110 being presented on content source 132 at play position 7:45. For example, at play position 7:45, media asset 110 may be presenting an opera sound category which, according to the user profile, is an attribute the user does not enjoy. The media guidance application may determine that attribute B 142 of media asset 110 is not included in a profile of the user or is listed as disliked by the user in the profile of the user. As such, the media guidance application may search for content from the favorite content sources that includes attributes related to attribute B 142. which the user dislikes to avoid accessing such favorite content sources. The third rank may be the lowest rank (this rank is lower than the first and second ranks).

In some embodiments, the media guidance application may select a play position within media asset 110 that precedes by a predetermined amount (e.g., 5 seconds) the play position within media asset 110 when the user requests to access the favorite content sources. This may be performed in response to receiving a user request to access the favorite content sources. The media guidance application may identify attribute A 140 that is present in media asset 110 at the earlier play position using the attribute field of the data structure associated with media asset 110. The media guidance application may perform the above ranking of the favorite content sources in the same manner based on attribute A 140 of media asset 110 that is present at the earlier play position.

The media guidance application may search for content on the favorite content sources that currently is being received that includes the attribute that was received at an earlier point in media asset 110 that is currently being accessed. Namely, the media guidance application may determine whether the attribute of content previously received from the current content source matches attributes of content currently being received from the favorite content sources. In such circumstances, the user may have been enjoying media asset 110 because attribute A 140 was present but when attribute B 142 became present the user decided to view a different media asset and requests to access the favorite content sources. The media guidance application may associate favorite content sources with a first rank in response to determining that attribute A 140 is present or related to content being currently received from such favorite content sources.

In some embodiments, the media guidance application may sort the favorites list based on the ranks associated with content on the favorite content sources. For example, favorites list 130 may include a set of favorite content sources arranged in a first order. The order shown in favorites list 130 may determine the order in which each content source is accessed sequentially each time a favorites command (e.g., a request to access a favorite content source or a request to access a next content source) is received from a user. Favorites list 130 may include a content source name and a content source channel number. As shown, the order of the content sources in list 130 does not correspond to the channel numbers of the content sources but rather to the order in which those content sources will be accessed.

In some embodiments, the media guidance application may retrieve a data structure for each content source in favorites list 130. The media guidance application may retrieve from each data structure a rank stored in the rank field of each respective data structure. The media guidance application may compare each of the ranks to each other and order the data structures in accordance with the retrieved ranks. In some implementations, the media guidance application may position the data structure that stores a highest rank (e.g., first rank) first in the list and may position the data structure that stores a lowest rank (e.g., third rank) at the end of the list. The media guidance application may identify the favorite content sources associated with the retrieved and ordered data structures. The media guidance application may then automatically sort or arrange the favorite content sources in list 130 according to the positions of the data structures in the list.

For example, a first content source (e.g., Hulu Show 7) which may currently be last in favorites list 130 may be associated with a rank that is higher than a second content source (e.g., VOD 3) which may currently be in the first position in favorites list 130. In response to determining that the first content source is associated with a higher rank than the second content source, the media guidance application may position the first content source ahead of the second content source. In particular, as shown in re-arranged favorites list 220, the first content source has been moved to the second position in the list ahead of the second content source which has been moved to the third position in the list.

In some embodiments, the media guidance application may determine that the third favorite and fourth favorite content sources (e.g., Channel 35 and Channel 8, respectively) are currently transmitting content that includes attribute B 142. The media guidance application may also determine that attribute B 142 was included in media asset 110 when a user request to access the favorite content sources was received and that attribute B 142 does not match any user profile attribute (e.g., the user dislikes attribute B 142). The third and fourth favorite content sources, at the time the user request to access the favorite content sources was received, may have been in positions 3 and 4 in the favorites list. In response to determining that these content sources are currently providing content that includes attribute B 142, the media guidance application may automatically associate a lower rank to the third and fourth favorite content sources. This lower rank may be lower than a rank associated with all the other favorite content sources. Accordingly, as shown in list 220, the third and fourth favorite content sources have been automatically moved to the $5^{th}$ and $6^{th}$ positions in the favorites list. As such, these content sources will be accessed last in the favorites sequence instead of being accessed $3^{rd}$ and $4^{th}$ respectively.

In some embodiments, the media guidance application may determine that a fifth favorite content source (e.g., Channel 2) is currently transmitting content that includes attribute A 140. The media guidance application may also determine that attribute A 140 was included in media asset 110 a threshold time (e.g., 5 seconds) before a user request to access the favorite content sources was received and that attribute A 140 matches a user profile attribute (e.g., the user likes attribute A 140). The fifth favorite content source, at the time the user request to access the favorite content sources was received, may have been in positions 5 in the favorites list. In response to determining that this content source is currently providing content that includes attribute A 140, the media guidance application may automatically associate a high rank to the fifth favorite content source. This high rank may be higher than a rank associated with all the other favorite content sources. Accordingly, as shown in list 220, the fifth favorite content source has been automatically moved to the first position in the favorites list. As such, this content source is automatically accessed first in the favorites sequence when the user request to access the favorites list is received. As shown in display 200, media asset 210 is received from fifth content source 232 which is in first position 234 in the favorites list. Media asset 210 may be presented when the user request to access the favorites list is received and is currently presenting content that includes attribute A 140.

In some embodiments, after the media guidance application accesses a given content source from the favorites list in response to receiving the user request to access a favorite content source, the media guidance application may continue monitoring attributes of media asset 110. The media guidance application may dynamically automatically re-arrange the favorite content sources in the favorites list based on the currently attributes of content provided by those sources. For example, the media guidance application may position content source 132 last in the favorites list because a user request to access the favorite content sources was received when media asset 110 provided by content source 132 included attribute B 142 which may not match an attribute of the user profile. The media guidance application may continue monitoring content provided by content source 132 and after a given amount of time (e.g., 5 minutes), the media guidance application may determine that attribute B 142 is no longer being presented. For example, the media guidance application may determine that attribute C is currently being provided by content from content source 132. Accordingly, the media guidance application may position content source 132 at the top of the favorites list (e.g., the first position) from the last position. As such, the next time a user request to access the next content source in the favorites list is received (e.g., when content source 132 is currently being accessed and a user command to navigate to the next favorite content source is received); content source 132 may be accessed by the media guidance application.

Figure 3:
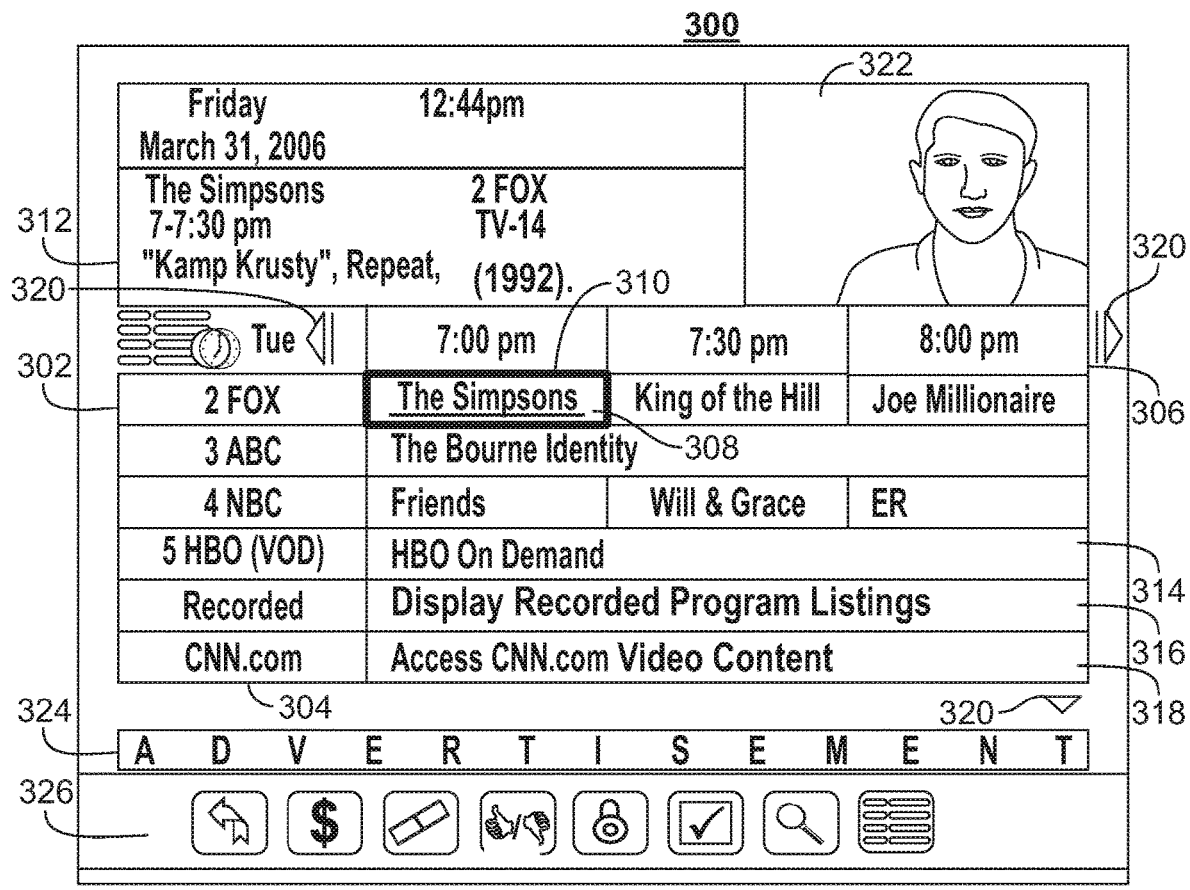
FIGS. 3 and 4 show illustrative display screens that may be used to provide media guidance application listings in accordance with an embodiment of the disclosure.

FIG. 3 shows illustrative grid of a program listings display 300 arranged by time and channel that also enables access to different types of content in a single display. In some implementations, the grid of program listings in display 300 may represent only favorite channels of the user. Display 300 may include grid 302 with: (1) a column of channel/ content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO providing "The Sopranos" and "Curb Your Enthusiasm" via the HBO GO service). THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand liking 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/ or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized. guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 4:
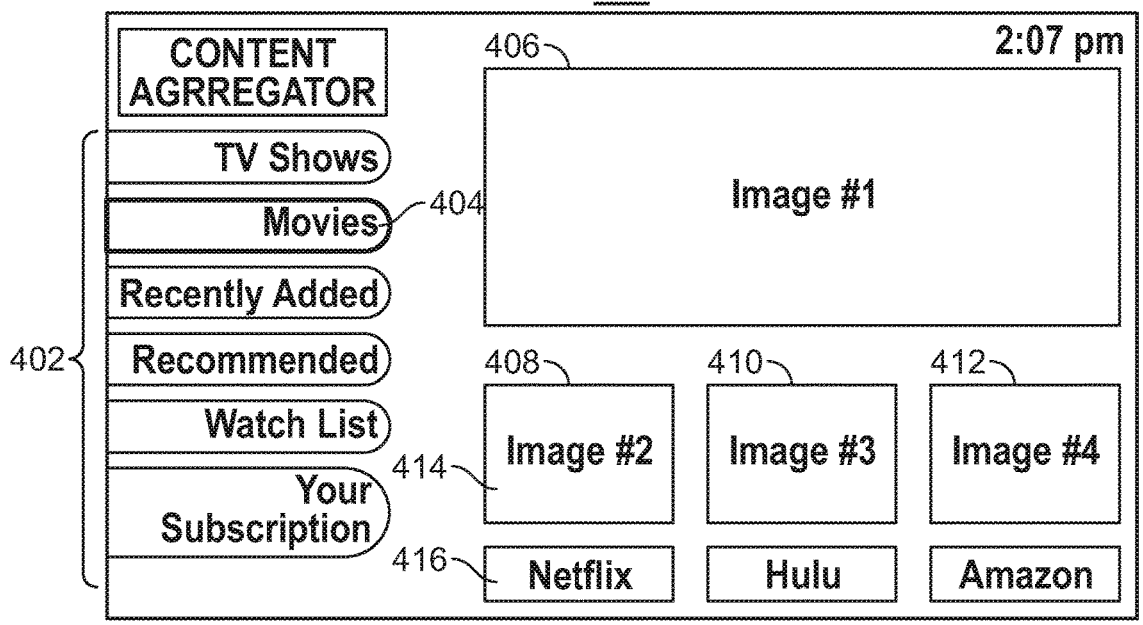

Another display arrangement for providing media guidance is shown in FIG. 4. Video mosaic display 400 includes selectable options 402 for content information organized based on various organization criteria, such as recommendations, inclusion in a watch list, and type of content. In display 400, movie listing option 404 is selected, thus providing listings 406, 408, 410, and 412 as movies. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the specified content provider).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
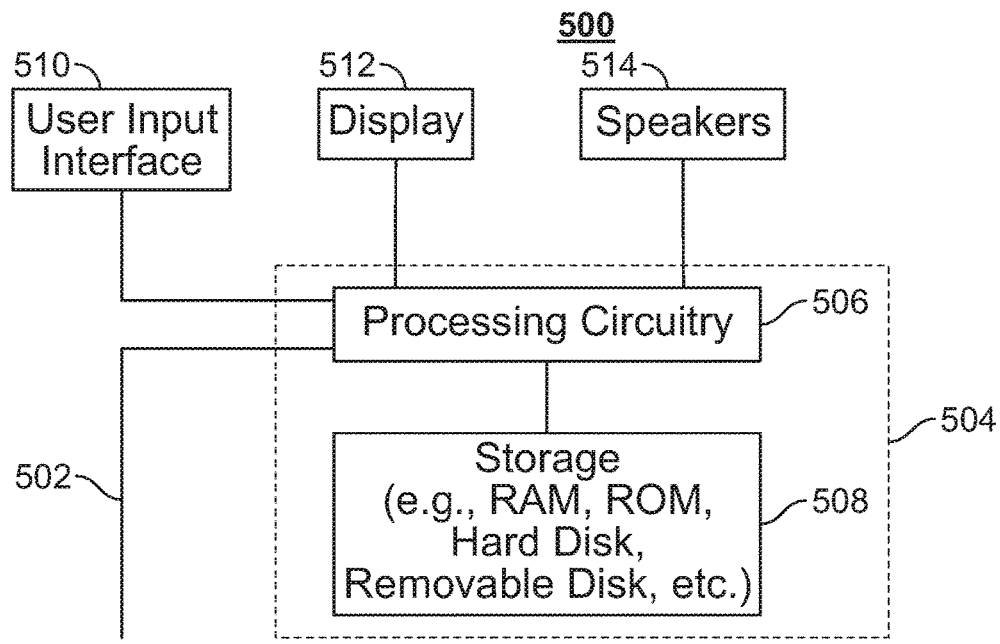
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. Equipment device 500 may be implemented on user television equipment 602, user computer equipment 604, and wireless user communications device 606. Additionally, device 500 may be implemented as part of the servers associated with content providers 616 and 618, and as part of the server associated with content aggregator 630. Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaining media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508. For example, storage 508 may be used to store viewing histories and/or maximum viewing progress for various users.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

When equipment device 500 is implemented on user television equipment 602, user computer equipment 604, or wireless user communications device 606, a user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets HTML web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2, or other digital media encoding schemes), the guidance application may be, for example, encoded and transmitted in an MPEG-2 object carousel with the MPEG audio and video packets of a program.

Figure 6:
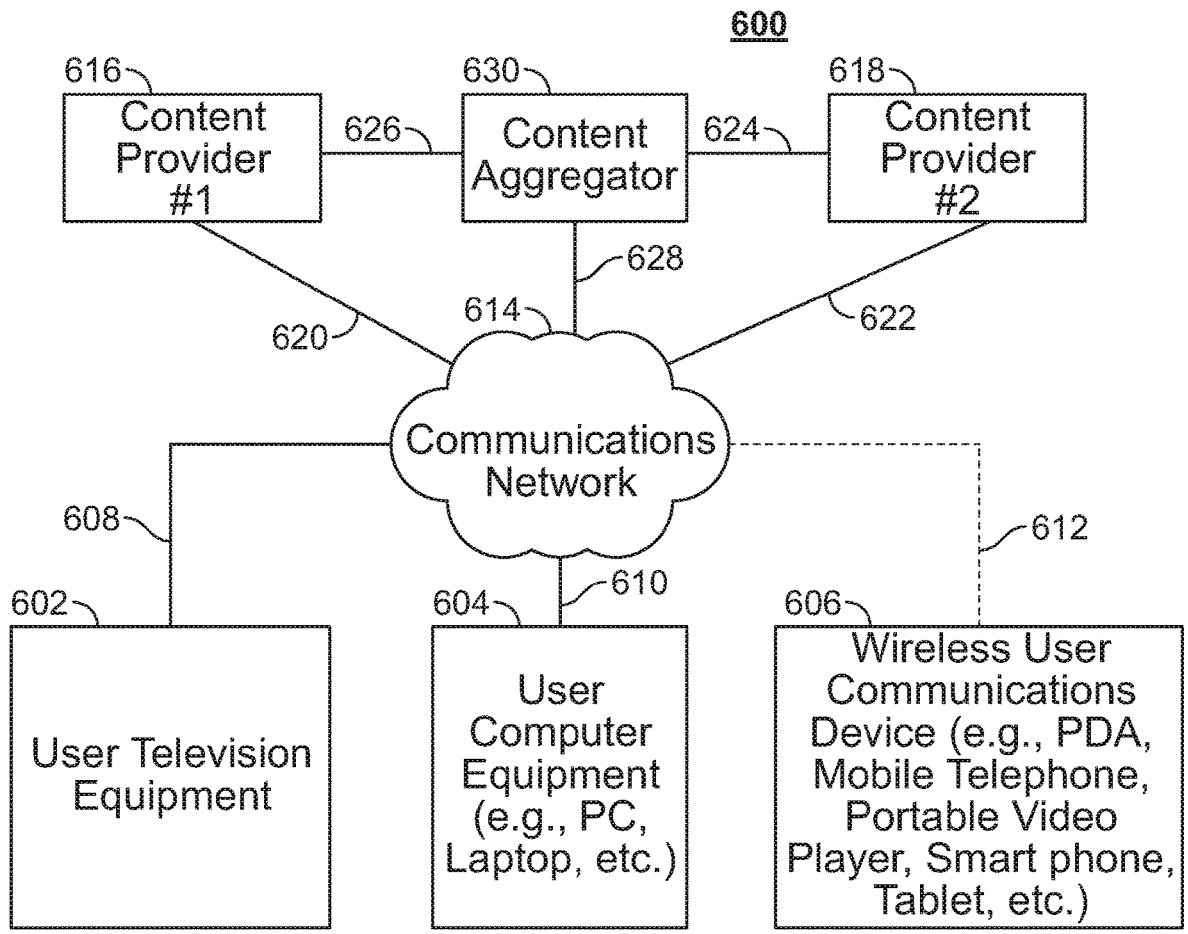
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. Additionally, equipment device 500 may be implemented as part of the servers associated with content providers 616 and 618, and as part of the server associated with content aggregator 630.

A user equipment device utilizing at leak some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, and wireless user communications device 606) may be referred to as a "second screen device." In some implementations, user television equipment 602, user computer equipment 604, and wireless user communications device 606 may include one or more smartphones and/or tablet devices. For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, viewing progress information, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes providers 616 and 618, as well as content aggregator 630 coupled to communications network 614 via communication paths 620, 622, 624, 626 and 628, respectively. Paths 620, 622, 624, 626 and 628 may include any of the communication paths described above in connection with paths 608, 610, and 612. Communications with the content provider 616 and content aggregator 630 may be exchanged over one or more communications paths, but are shown as a single path in FIG. 6 to avoid overcomplicating the drawing. In addition, there may be more than one of each of content provider 616 and content aggregator 630, but only two content providers and one of each content aggregator is shown in FIG. 6 to avoid overcomplicating the drawing. (The different types of each of these sources are discussed below.) Although communications between content providers 616 and 618 with user equipment devices 602, 604, and 606 are shown as through communications network 614, in some embodiments, content providers 616 and 618 may communicate directly with user equipment devices 602, 604, and 606 via communication paths (not shown) such as those described above in connection with paths 608, 610, and 612. In some cases, communications between content providers 616 and 618 with user equipment devices 602, 604, and 606 occur through content aggregator 630. For example, communications between user television equipment 602 and content provider 416 may occur over paths 626, 628, and 608.

Content providers 616 and 618 may include one or more types of content distribution equipment including a television distribution facility, service providers, cable system headend, satellite distribution facility, programming sources (e.g., television broadcasters, such as NBC, ABC, HBO, etc.), intermediate distribution facilities and/or servers, Internet providers, on-demand media servers (e.g., Netflix, Hulu, Amazon, etc.), and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content provider 616 may include cable sources, satellite providers, on-demand providers, Internet providers, over-the-top content providers, or other providers of content. Content provider 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. In some embodiments, control circuitry 504 implemented on content aggregator 630 may transmit a request over paths 626 and 624 for media guidance data from content providers 616 and 618.

Content aggregator 630 may collect media guidance data (e.g., viewing histories) from content providers 616 and 618, and provide such data, as described above. In some embodiments, content aggregator 630 may be the media application, discussed above and below that collects viewing histories for multiple users, Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Content aggregator 630 may communicate with equipment devices 602, 604, and 606 by way of clients installed on each of the equipment devices. For example, when a user initially subscribes to the content aggregator subscription, control circuitry 504, implemented on content aggregator 630, may facilitate the transfer of a client application to the equipment device. Control circuitry 504, implemented on each of equipment devices 602, 604, and 606, may then download, install, and configure the client application from content aggregator 630. The client application may then facilitate the delivery of media and media guidance data from content aggregator 630 to the equipment devices. The client application may further include a user interface, which control circuitry 504, implemented on equipment device 500, generates for display on display 512, for allowing the user to interact with media listings using user input interface 510, code for handling Digital Rights Management (DRM) data, as well as codecs and players needed for generating media for display on display 512. In some embodiments, the client may be configured to communicate directly with content providers 616 and 618. Content aggregator 630 may include a corresponding communications interface, so that control circuitry 504, implemented on the content aggregator may receive input from the client implemented on each equipment device. Control circuitry 504, implemented on content aggregator 630, may then send and receive data from each client, as well as from each content provider 616 and 618, using the communications interface. Content aggregator 630 may additionally include one or more databases to store subscriber information, viewing history data structures, and media content listings from content providers 416 and 418.

In some embodiments, content aggregator 630 may communicate with equipment devices by way of an Internet browser available on equipment devices 602, 604, and 606. For example, user computer equipment 604 may include an implementation of Internet Explorer. When the user wishes to access media offerings of the content aggregator subscription (e.g., a user may wish to access Netflix listings available as part of the content aggregator subscription to which the user subscribes to), control circuitry 504, implemented on equipment device 604, may output a browser window containing video mosaic display 400 on display 512. Control circuitry 504, implemented on equipment device 604, may then receive a selection from user input interface 510, indicating that the user wishes to access content from a subscription service that is part of the content aggregator subscription. For example, the user may direct a mouse pointer to highlight and select text portion 416 (e.g., Netflix) . Control circuitry 504 implemented on equipment device 604 may then transmit the input corresponding to text portion 416 to the process running the Internet browser, enabling the browser to retrieve and display the Internet web site (e.g., www.netflix.com) associated with the selected subscription service.

In some embodiments, guidance data from content aggregator 630 may be provided to users' equipment using a client-server approach. For example, a user equipment device may pull media guidance data from a server, or a server may push media guidance data to a user equipment device. In some embodiments, a guidance application client residing on the user's equipment may initiate sessions with content aggregator 630 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Content aggregator 630 may provide user equipment devices 602, 604, and 606, the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), viewing progress in one or more media assets, mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., content aggregator 630) running on control circuitry of the remote server. When executed by control circuitry of the remote server (such as content aggregator 630), the media guidance application may instruct the control circuitry to generate the guidance application displays and transmit the generated displays to the user equipment devices. The server application may instruct the control circuitry of the content aggregator 630 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, AMAZON, and HULU, which provide audio and video via IP packets. Youtube is a trademark owned by Google Inc., Netflix is a trademark owned by Netflix Inc., Amazon is a trademark owned by Amazon Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25. 2011, which is hereby incorporated by reference herein in its entirety.

In a third approach, users of user equipment devices inside and outside a home can use their media guidance application to communicate directly with content provider 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content providers 616 and one or more content aggregators 630. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may he accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

FIG. 7 is an illustrative flow diagram 700 for sorting favorite channels in accordance with some embodiments of the disclosure. At step 710, a list of favorite content sources arranged in a first order is stored. The favorite content sources in the list are accessed according to the order of the favorite content sources in the list. For example, the media guidance application may generate and store list 130 in storage 508 (FIG. 1).

At step 720, a user request to change a currently accessed content source to one of the favorite content sources in the list is received at a given time. For example, the media guidance application may receive a user selection of a favorites key on a remote control. The favorites key may instruct the media guidance application to access the next favorite channel on list 130. The user may select the favorites key while access media asset 110 at play position 7:45 (FIG. 1).

At step 730, in response to receiving the user request, an attribute of content presented on the currently accessed content source at the given time is identified. For example, the media guidance application may determine that attribute B 142 (e.g., an opera sound category) is being presented on media asset 110 when the user request to access the favorite content sources is received.

Figure 2:
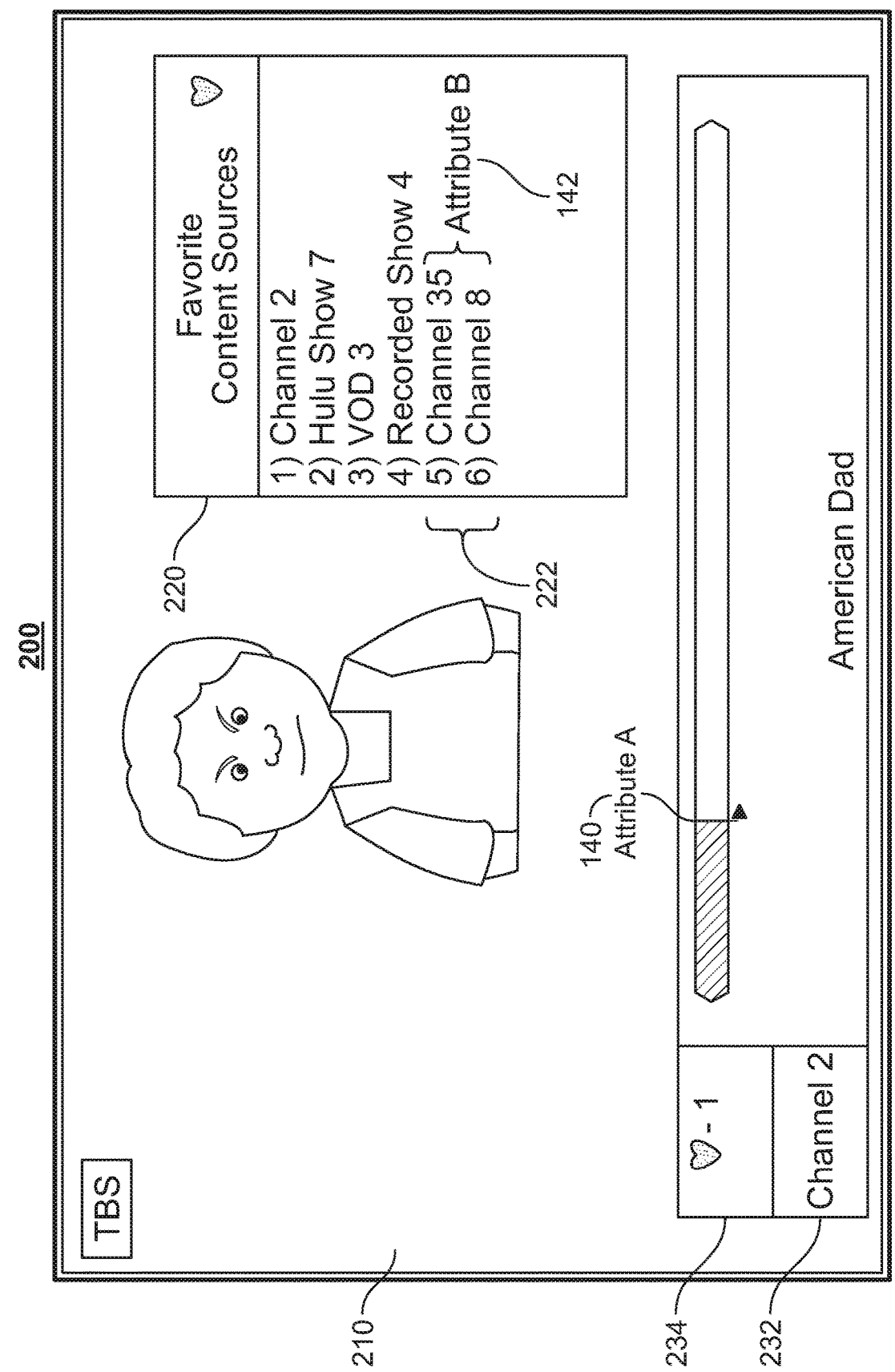
FIG. 2 shows an illustrative display screen that may be used for sorting favorite content sources with an embodiment of the disclosure.

At step 740, the favorite content sources in the list is rearranged into a second order based on the identified attribute. For example, the media guidance application may determine what attribute is currently being presented on the content sources in list 130. The media guidance application may position content sources that are presenting attribute B 142 at the bottom of the list. For example, content sources 222 in list 220 may be placed last in the list because they are presenting content with attribute B 142 (FIG. 2). Similarly, because a particular content source (e.g., Channel 2) is not presenting content with attribute B 142, that particular content source may be placed at the top of favorites list 220.

At step 750, the favorite content sources in the list are accessed according to the second order in response to receiving the user request. For example, the media guidance application may access the first content source in list 220 (e.g., Channel 2) in response to receiving the user request to access the favorite content sources while accessing content source 132. The favorite content source (e.g., Channel 2) in list 220 may be accessed first because this source has been moved from position 4 in list 130 to the first position in list 220 based on the attribute being presented in media asset 110 and content from content source, Channel 2, when the user request to access the content sources was received.

Figure 8:
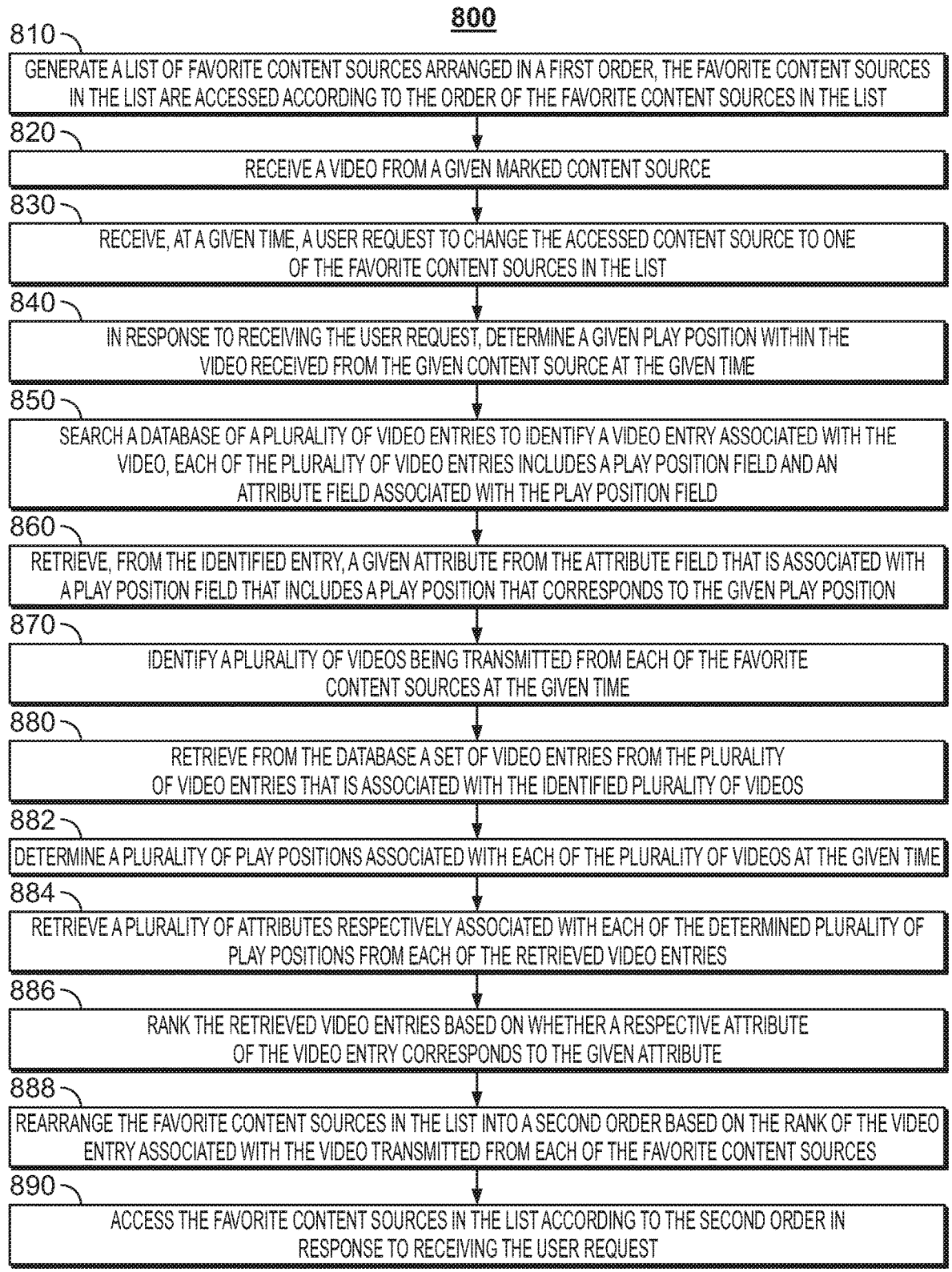

FIG. 8 is an illustrative flow diagram 800 for sorting favorite channels in accordance with some embodiments of the disclosure. At step 810, a list of favorite content sources arranged in a first order is generated. The favorite content sources in the list are accessed according to the order of the favorite content sources in the list. For example, the media guidance application may receive a user input selecting individual content sources for inclusion in the favorites list. The user input may also specify the order of the content sources in the list. The order of the content sources may determine the sequence in which the content sources are accessed in response to a user request to access the favorite content sources. In some implementations, the user may also specify which of the content sources on the favorites list is marked. The media guidance application may monitor attributes of marked content sources for sorting the content sources in the favorites list.

At step 820, a video from a given marked content source is received. For example, the media guidance application may receive media asset 110 from content source 132 (FIG. 1).

At step 830, a user request to change the accessed content source to one of the favorite content sources in the list is received at a given time. For example, the media guidance application may receive a user selection of a favorites key on a remote control. The favorites key may instruct the media guidance application to access the next favorite channel on list 130. The user may select the favorites key while access media asset 110 at play position 7:45 (FIG. 1).

At step 840, in response to receiving the user request, a given play position within the video received from the given content source at the given time is determined. For example, the media guidance application may determine that the user request was received when play position 7:45 (min:sec) of media asset 11 was being received from content source 132.

At step 850, a database of a plurality of video entries is searched to identify a video entry associated with the video, each of the plurality of video entries includes a play position field and an attribute field associated with the play position field. For example, the media guidance application may transmit a video identifier (e.g., title) of media asset 110 to the database. The database may search video identifier fields of video data structures to identify and retrieve the video data structure associated with the video identifier received from the media guidance application.

At step 860, a given attribute, from the identified entry, is retrieved from the attribute field that is associated with a play position field that includes a play position that corresponds to the given play position. For example, the media guidance application may search the play position fields of the retrieved video data structure for a play position that matches (e.g., a range of play positions that overlap) the determined play position (e.g., play position 7:45). The media guidance application may retrieve from the attribute field associated with the matching play position field an attribute (e.g., attribute B 142) stored in the attribute field.

At step 870, a plurality of videos being transmitted from each of the favorite content sources at the given time is identified. For example, the media guidance application may search guidance data stored in storage 508 for videos being transmitted from the favorite content sources stored in the favorite content source list. In particular, the media guidance application may search the guidance data based on source identifiers stored in the favorite content sources and a current time for video identifiers of videos being transmitted from these content sources at the current time.

At step 880, a set of video entries from the plurality of video entries that is associated with the identified plurality of videos is retrieved from the database. For example, the media guidance application may transmit, to the database, the video identifiers (e.g., titles) of the videos identified in the guidance data that are currently being transmitted by the favorite content sources. The database may search video identifier fields of video data structures to identify and retrieve the video data structures associated with the video identifiers received from the media guidance application.

At step 882, a plurality of play positions associated with each of the plurality of videos is determined at the given time. For example, the media guidance application may search guidance data stored in storage 508 for the current play positions of the videos being transmitted from the favorite content sources stored in the favorite content source list. For example, the media guidance application may determine how many minutes into the duration of a given video have elapsed since the video has started to be transmitted from the content source.

At step 884, a plurality of attributes respectively associated with each of the determined plurality of play positions is retrieved from each of the retrieved video entries. For example, the media guidance application may perform the same process performed for step 860 for each video currently being transmitted from the favorite content sources.

At step 886, the retrieved video entries is ranked based on whether a respective attribute of the video entry corresponds to the given attribute. For example, the media guidance application may perform process 900 (FIG. 9) to rank each video entry.

At step 888, the favorite content sources in the list are rearranged into a second order based on the rank of the video entry associated with the video transmitted from each of the favorite content sources. For example, the media guidance application may change the order of the content sources from list 130 to the order in list 220 (FIGS. 1 and 2) based on the determined rank of the content source.

At step 890, the favorite content sources in the list are accessed according to the second order in response to receiving the user request. For example, the media guidance application may access content source 232, the first content source in the favorites list, in response to receiving the user request to access the favorite content sources.

Figure 9:
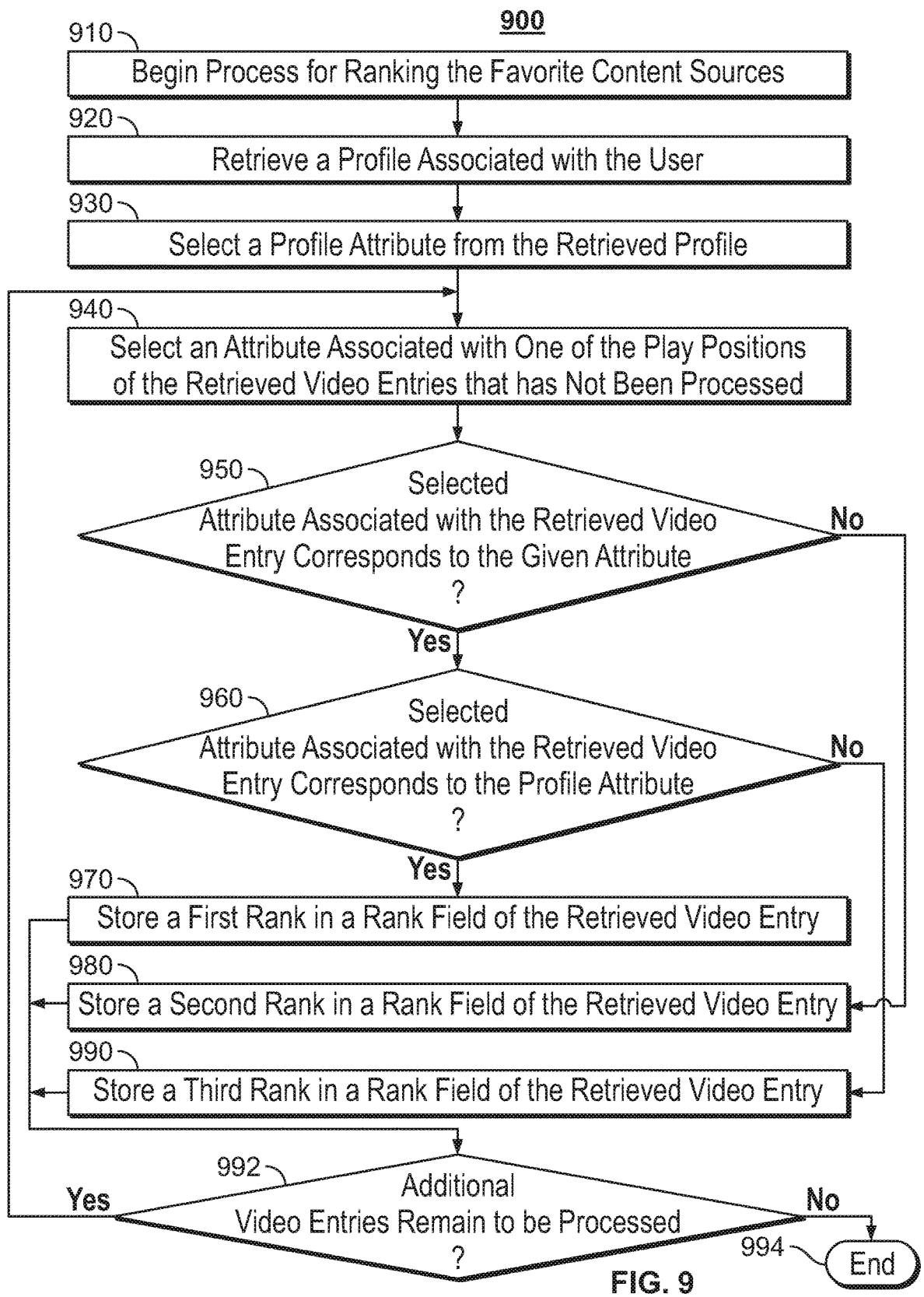
FIG. 9 is a illustrative flow diagram for ranking favorite content sources in accordance with some embodiments of the disclosure.

FIG. 9 is an illustrative flow diagram 900 for ranking favorite channels in accordance with some embodiments of the disclosure. At step 910, the process for ranking the favorite content sources begins.

At step 920, a profile associated with the user is retrieved. For example, the media guidance application may identify a user of the media guidance application (e.g., through an initial login screen and/or facial recognition or biometric information). The media guidance application may retrieve from storage 508 the user profile of the identified user.

At step 930, a profile attribute is selected from the retrieved profile. For example, the user profile may include a set of attributes that a user likes and/or a set of attributes a user dislikes. The media guidance application may select one or more of the attributes stored in the profile that the user likes.

At step 940, an attribute associated with one of the play positions of the retrieved video entries that has not been processed is selected. For example, the media guidance application may select a video data structure associated with one of the favorite content sources. The media guidance application may retrieve the attribute associated with the current play position from the selected video data structure.

At step 950, a determination is made as to whether the selected attribute associated with the retrieved video entry corresponds to the given attribute. In response to determining that the selected attribute associated with the retrieved video entry corresponds to the given attribute, the process proceeds to step 960, otherwise the process proceeds to step 980. For example, the media guidance application may determine whether the selected attribute associated with the retrieved video entry matches or is related to the attribute of the content (e.g., media asset 110) provided by the marked content source at the time the user request to access the favorite content sources is received.

At step 960, a determination is made as to whether the selected attribute associated with the retrieved video entry corresponds to the profile attribute. In response to determining that the selected attribute associated with the retrieved video entry corresponds to the profile attribute, the process proceeds to step 970, otherwise the process proceeds to step 990. For example, the media guidance application may determine whether the selected attribute associated with the retrieved video entry matches or is related to the attribute stored in the user profile.

At step 970, a first rank is stored in a rank field of the retrieved video entry. For example, the media guidance application may store a high rank in the rank field.

At step 980, a second rank is stored in a rank field of the retrieved video entry. For example, the media guidance application may store a medium rank in the rank field.

At step 990, a third rank is stored in a rank field of the retrieved video entry. For example, the media guidance application may store a low rank in the rank field.

At step 992, a determination is made as to whether additional video entries remain to be processed. In response to determining that additional video entries remain to be processed, the process proceeds to step 940, otherwise the process proceeds to step 994.

At step 994, the process ends.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for sorting a favorite channels list, the method comprising:
   generating a list of favorite content sources arranged in a first order, wherein the favorite content sources in the list are accessed according to the order of the favorite content sources in the list;
   receiving a video from a given content source;
   receiving, at a given time, a user request to change the accessed content source to one of the favorite content sources in the list;
   in response to receiving the user request, determining a given play position within the video received from the given content source at the given time;
   searching a database of a plurality of video entries to identify a video entry associated with the video, wherein each of the plurality of video entries includes a play position field and an attribute field associated with the play position field;
   retrieving, from the identified entry, a given attribute from the attribute field that is associated with a play position field that includes a play position that corresponds to the given play position;
   identifying a plurality of videos being transmitted from each of the favorite content sources at the given time;
   retrieving from the database a set of video entries from the plurality of video entries that is associated with the identified plurality of videos;
   determining a plurality of play positions associated with each of the plurality of videos at the given time;
   retrieving a plurality of attributes respectively associated with each of the determined plurality of play positions from each of the retrieved video entries;
   determining whether the retrieved plurality of attributes correspond to the given attribute;
   ranking the retrieved video entries based on the determination of whether the retrieved plurality of attributes correspond to the given attribute;
   rearranging the favorite content sources in the list into a second order based on the rank of the video entry associated with the video transmitted from each of the favorite content sources; and
   accessing the favorite content sources in the list according to the second order in response to receiving the user request.

2. The method of claim 1, wherein ranking the retrieved video entries comprises:
   retrieving a profile associated with the user;
   selecting a profile attribute from the retrieved profile;
   determining whether the retrieved plurality of attributes correspond to the profile attribute; and
   associating each of the retrieved video entries with a top rank in response to determining that the respective attribute of the video entry matches the given attribute and matches the profile attribute.

3. The method of claim 2, wherein the top rank is a first rank, further comprising:
   associating each of the retrieved video entries with a second rank, lower than the first rank, in response to determining that the respective attribute of the video entry fails to match the given attribute; and
   associating each of the retrieved video entries with a third rank, lower than the first and second ranks, in response to determining that the respective attribute of the video entry matches the given attribute and fails to match the profile attribute.

4. The method of claim 1, wherein:
   the attribute is at least one of a character in a scene, an actor, a director, a genre, a category, a sound category, a duration, a quality metric, and a program type; and
   the content source is at least one of an on-demand source, a broadcast source, a cable source, a satellite source, a television channel, an Internet source, and a website.

5. The method of claim 1, wherein generating the list of favorite content sources comprises receiving a user selection of each of the favorite content sources and an indication of how to order the favorite content sources in the list.

6. The method of claim 1, wherein determining the given play position within the video comprises selecting a play position within the video that precedes the given time when the user request was received by a predetermined amount.

7. The method of claim 1 further comprising monitoring attributes of content received from the given content source while accessing one of the favorite content sources.

8. The method of claim 7 further comprising:
    determining whether the monitored attributes correspond to the given attribute; and
    in response to determining that none of the monitored attributes correspond to the given attribute, rearranging the favorite content sources in the list into a third order, wherein the given content source is positioned first in the third order ahead of the other favorite content sources.

9. The method of claim 1, wherein receiving the user request comprises receiving a first user selection of a favorites key on an input device, and wherein accessing the favorite content sources in the list comprises:
    accessing a first of the favorite content sources that is positioned first in the list in response to receiving the user request;
    receiving a second user selection of the favorites key after the first favorite content source is accessed; and
    in response to receiving the second user selection, accessing a second of the favorite content sources that is positioned second in the list following the first favorite content source.

10. The method of claim 1, wherein ranking the retrieved video entries comprises:
    storing a rank value in a rank field of each of the retrieved video entries; and
    sorting the retrieved video entries based on the rank value stored in the rank field of each of the retrieved video entries.

11. A system for sorting a favorite channels list, the system comprising:
    control circuitry configured to:
        generate a list of favorite content sources arranged in a first order, wherein the favorite content sources in the list are accessed according to the order of the favorite content sources in the list;
        receive a video from a given content source;
        receive, at a given time, a user request to change the accessed content source to one of the favorite content sources in the list;
        in response to receiving the user request, determine a given play position within the video received from the given content source at the given time;
        search a database of a plurality of video entries to identify a video entry associated with the video, wherein each of the plurality of video entries includes a play position field and an attribute field associated with the play position field;
        retrieve, from the identified entry, a given attribute from the attribute field that is associated with a play position field that includes a play position that corresponds to the given play position;
        identify a plurality of videos being transmitted from each of the favorite content sources at the given time;
        retrieve from the database a set of video entries from the plurality of video entries that is associated with the identified plurality of videos;
        determine a plurality of play positions associated with each of the plurality of videos at the given time;
        retrieve a plurality of attributes respectively associated with each of the determined plurality of play positions from each of the retrieved video entries;
        determine whether the retrieved plurality of attributes correspond to the given attribute;
        rank the retrieved video entries based on the determination of whether the retrieved plurality of attributes correspond to the given attribute;
        rearrange the favorite content sources in the list into a second order based on the rank of the video entry associated with the video transmitted from each of the favorite content sources; and
        access the favorite content sources in the list according to the second order in response to receiving the user request.

12. The system of claim 11, wherein the control circuitry configured to rank the retrieved video entries is further configured to:
    retrieve a profile associated with the user;
    select a profile attribute from the retrieved profile;
    determine whether the retrieved plurality of attributes correspond to the profile attribute; and
    associate each of the retrieved video entries with a top rank in response to determining that the respective attribute of the video entry matches the given attribute and matches the profile attribute.

13. The system of claim 12, wherein the top rank is a first rank, and wherein the control circuitry is further configured to:
    associate each of the retrieved video entries with a second rank, lower than the first rank, in response to determining that the respective attribute of the video entry fails to match the given attribute; and
    associate each of the retrieved video entries with a third rank, lower than the first and second ranks, in response to determining that the respective attribute of the video entry matches the given attribute and fails to match the profile attribute.

14. The system of claim 11, wherein:
    the attribute is at least one of a character in a scene, an actor, a director, a genre, a category, a sound category, a duration, a quality metric, and a program type; and
    the content source is at least one of an on-demand source, a broadcast source, a cable source, a satellite source, a television channel, an Internet source, and a website.

15. The system of claim 11, wherein the control circuitry configured to generate the list of favorite content sources is further configured to receive a user selection of each of the favorite content sources and an indication of how to order the favorite content sources in the list.

16. The system of claim 11, wherein the control circuitry configured to determine the given play position within the video is further configured to select a play position within the video that precedes the given time when the user request was received by a predetermined amount.

17. The system of claim 11, wherein the control circuitry is further configured to monitor attributes of content received from the given content source while accessing one of the favorite content sources.

18. The system of claim 17, wherein the control circuitry is further configured to:
    determine whether the monitored attributes correspond to the given attribute; and
    in response to determining that none of the monitored attributes correspond to the given attribute, rearrange the favorite content sources in the list into a third order, wherein the given content source is positioned first in the third order ahead of the other favorite content sources.

19. The system of claim 11, wherein the user request comprises a first user selection of a favorites key on an input device, and wherein the control circuitry configured to access the favorite content sources in the list is further configured to:

access a first of the favorite content sources that is positioned first in the list in response to receiving the user request;

receive a second user selection of the favorites key after the first favorite content source is accessed; and in response to receiving the second user selection, access a second of the favorite content sources that is positioned second in the list following the first favorite content source.

20. The system of claim 11, wherein the control circuitry configured to rank the retrieved video entries is further configured to:

store a rank value in a rank field of each of the retrieved video entries; and sort the retrieved video entries based on the rank value stored in the rank field of each of the retrieved video entries.

* * * * *